United States Patent
Park et al.

(10) Patent No.: US 9,140,611 B2
(45) Date of Patent: Sep. 22, 2015

(54) INFRARED RAY DETECTOR AND METHOD OF DETECTING INFRARED RAYS BY USING THE SAME

(75) Inventors: Hae-seok Park, Yongin-si (KR); Sung-hyun Nam, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 173 days.

(21) Appl. No.: 13/568,628

(22) Filed: Aug. 7, 2012

(65) Prior Publication Data
US 2013/0161515 A1   Jun. 27, 2013

(30) Foreign Application Priority Data
Dec. 22, 2011 (KR) .................. 10-2011-0140397

(51) Int. Cl.
*G01J 5/20* (2006.01)
*G01J 5/08* (2006.01)
*G01J 5/02* (2006.01)

(52) U.S. Cl.
CPC .............. *G01J 5/0862* (2013.01); *G01J 5/023* (2013.01); *G01J 5/084* (2013.01); *G01J 5/20* (2013.01); *G01J 5/0245* (2013.01)

(58) Field of Classification Search
CPC .......... G01J 5/20; G01J 5/024; G01J 5/0853; G01J 5/02; G01J 5/0205; G01J 5/0225; G01J 5/023; H01C 7/043
See application file for complete search history.

(56) References Cited

U.S. PATENT DOCUMENTS

| | | | |
|---|---|---|---|
| 6,855,934 | B2 | 2/2005 | Mekata et al. |
| 7,582,859 | B2 | 9/2009 | Krellner |
| 2002/0040967 | A1* | 4/2002 | Oda .......................... 250/338.1 |
| 2003/0141453 | A1* | 7/2003 | Reed et al. ................. 250/338.1 |
| 2006/0180758 | A1* | 8/2006 | Troxell ...................... 250/338.1 |
| 2010/0006757 | A1 | 1/2010 | Oda |
| 2010/0171190 | A1* | 7/2010 | Liger ............................ 257/428 |
| 2010/0288915 | A1 | 11/2010 | Endo |
| 2011/0024855 | A1 | 2/2011 | Suzuki et al. |
| 2011/0068272 | A1 | 3/2011 | Dupont et al. |
| 2011/0204231 | A1* | 8/2011 | Razansky et al. .......... 250/338.1 |

FOREIGN PATENT DOCUMENTS

KR   20090065941 A   6/2009

OTHER PUBLICATIONS

Accuratus, "Silicon Nitride, Si3N4 Ceramic Properties," Retrieved from internet [Mar. 8, 2014]; Retrieved from url <http:accuratus.com/silinit.html>.*
Siliconfareast.com, "Properties of SiO2 and Si3N4 at 300K," Retrieved from internet [Mar. 8, 2014]; Retrieved from url <http:siliconfareast.com>.*

* cited by examiner

*Primary Examiner* — Yara B Green
(74) *Attorney, Agent, or Firm* — Harness, Dickey & Pierce, P.L.C.

(57) ABSTRACT

A infrared ray detector includes a first metal layer; a second metal layer on the first metal layer and configured to absorb infrared rays; a thermistor layer below the second metal layer, the thermistor layer having a resistance that changes according to infrared rays absorbed in the second metal layer; a thermal leg below the thermistor layer and separated from the first metal layer; and a control unit configured to control a gap between the first metal layer and the thermal leg.

18 Claims, 6 Drawing Sheets

INFRARED RAY DETECTOR AND METHOD OF DETECTING INFRARED RAYS BY USING THE SAME

CROSS-REFERENCE TO RELATED APPLICATIONS

This application claims the benefit of Korean Patent Application No. 10-2011-0140397, filed on Dec. 22, 2011, in the Korean Intellectual Property Office, the disclosure of which is incorporated herein in its entirety by reference.

BACKGROUND

1. Field

At least one example embodiment relates to infrared ray detectors and/or methods of detecting infrared rays using the same, and more particularly, to infrared ray detectors that compensate for temperatures and/or methods of detecting infrared rays using the same.

2. Description of the Related Art

An object having a temperature T radiates a wide range of light, which has a maximum value at a specific wavelength due to blackbody radiation. For example, light radiated to surroundings from an object having a temperature T radiates infrared rays having a maximum value at a wavelength of approximately 10 µm. When the infrared rays are incident to a thermal mass that is supported by a thermal leg, the temperature of the infrared rays is increased. Due to the temperature change of the incident infrared rays, characteristic changes of a material, such as, resistance change, polarity change, electromotive force change, or bending change may be obtained according to the type of material. Thus, a thermal image may be obtained using the thermal characteristics of the material. In particular, a method of realizing a thermal image using a resistance change of a material may involve a bolometer.

Key factors that determine the magnitude of a temperature change in a pixel are an amount of incident energy that is proportional to the multiple of an average optical absorption rate of a pixel at a given wavelength range and the area of the pixel, a thermal mass of the pixel, and a thermal conductance of the pixel.

In order to realize a thermal camera having a high resolution and a high temperature precision, an array having a format higher than a VGA class has been developed through a reduction of pixel size. However, the reduction of the pixel size results in the reduction of a pixel area, which reduces the amount of incident energy and reduces the length of the thermal leg. As a result, the thermal conductivity of the pixel is increased, and accordingly, the temperature change thereof is reduced and the temperature noise figure is increased. Therefore, currently, a pixel size is limited by a diffraction limit of the wavelength (~10 lm), where an object radiates infrared rays having a maximum value.

SUMMARY

At least one example embodiment provides infrared ray detectors and/or methods of detecting infrared rays using the same.

Additional aspects will be set forth in part in the description which follows and, in part, will be apparent from the description, or may be learned by practice of example embodiments.

According to an example embodiment, an infrared ray detector includes: a first metal layer; a second metal layer on the first metal layer and absorbing infrared rays; a thermistor layer supporting the second metal layer and having a resistance that is changed by infrared rays absorbed in the second metal layer; a thermal leg supporting the thermistor layer and separated from the first metal layer; and a control unit configured to control a gap between the first metal layer and the thermal leg.

In at least one example embodiment, the second metal layer may have a patterned shape to absorb infrared rays by generating a localized surface plasmon resonance (LSPR).

In at least one example embodiment, at least one of the second metal layer and the thermistor layer may have at least one of a disc shape, a ring shape, a bar shape, and a shape in which a plurality of bars cross each other.

In at least one example embodiment, the thermal leg may include at least one of silicon nitride, silicon oxide, a metal material, and a thermistor material.

In at least one example embodiment, the thermal leg may perform the function of the thermistor layer.

In at least one example embodiment, the infrared ray detector may further include a dielectric layer between the thermal leg and the second metal layer.

In at least one example embodiment, the infrared ray detector may further include an insulating layer between the first metal layer and the thermal leg.

In at least one example embodiment, the infrared ray detector may further include a plurality of post units separated from each other and connected to the thermal leg.

In at least one example embodiment, the infrared ray detector may further include a power unit configured to apply a voltage between the first metal layer and the thermal leg.

In at least one example embodiment, the control unit may be configured to determine a compensated resistance by compensating for a second resistance change of the thermistor layer when a gap between the first metal layer and the thermal leg is a desired value based on a first resistance change of the thermistor layer when the gap between the first metal layer and the thermal leg is zero.

In at least one example embodiment, the thermistor layer may include at least one of amorphous silicon, vanadium oxide, nickel oxide, and Si—Ge.

In at least one example embodiment, the first and second metal layers may be formed of at least one of Au, Ag, Pt, Cu, Al, Ti, and an alloy of these metals.

According to an example embodiment, there is provided a method of detecting infrared rays by using the infrared ray detector described above, the method may include: absorbing infrared rays incident to the second metal layer in the second metal layer by generating an LSPR while changing a gap between the first metal layer and the thermal leg; changing a resistance value of the thermistor layer according to a temperature change caused by the absorbed infrared rays; and transmitting a resistance change to the control unit after measuring the resistance change.

In at least one example embodiment, the gap between the first metal layer and the thermal leg may be controlled by a magnitude of a voltage applied between the first metal layer and the thermal leg.

In at least one example embodiment, the method may further include measuring a first resistance change of the thermistor layer if the gap between the first metal layer and the thermal leg is zero.

In at least one example embodiment, the method may further include measuring a second resistance change of the thermistor layer if the gap between the first metal layer and the thermal leg is a desired value.

In at least one example embodiment, a compensated resistance change may be obtained by compensating for the second resistance change of the second metal layer if the gap between the first metal layer and the thermal leg is a desired value based on the first resistance change of the thermistor layer when the gap between the first metal layer and the thermal leg is zero.

In at least one example embodiment, the control unit may be configured to determine a compensated thermal image in response to a compensated resistance change.

In at least one example embodiment, the infrared ray detector may further include a plurality of post units separated from each other and connected to the thermal leg, and the resistance change may be transmitted to the control unit through the post units.

In at least one example embodiment, at least one of the second metal layer and the thermistor layer may have at least one of a disc shape, a ring shape, a bar shape, and a shape in which a plurality of bars cross each other.

In at least one example embodiment, the thermal leg may be formed as a single layer or a multiple layer by stacking at least of silicon nitride, silicon oxide, a metal material, and a thermistor material.

In at least one example embodiment, the thermal leg may perform the function of the thermistor layer.

According to an example embodiment, a thermal detector may include: a first layer on a substrate; a thermistor layer above the first layer; an second layer on the thermistor layer, the second layer configured to vary a resistance of the thermistor layer according a change in temperature of the second layer, and the thermistor layer defining an air gap above the first layer; and a control unit configured to vary a size of the air gap, determine a compensated resistance change, and output a thermal image according to the compensated resistance change.

In at least one example embodiment, the compensated resistance change is based on at least one resistance change of the thermistor layer, and the at least one resistance change of the thermistor layer is based on the size of the air gap.

In at least one example embodiment, the thermal detector further includes: at least one post connected to the thermistor layer, the at least one post being on a side of the first layer and further defining the air gap; and an insulating layer between the first layer and the thermistor layer.

In at least one example embodiment, the thermal detector further includes: a voltage supply coupled to the first layer and the thermistor layer and configured to vary the size of the air gap according to a voltage.

In at least one example embodiment, a localized surface plasmon resonance occurs at an interface of the thermistor layer and the second layer.

In at least one example embodiment, the thermistor layer is a multi-layer structure including a thermistor device on a thermal leg, and the thermal leg is coupled to the thermal detector.

BRIEF DESCRIPTION OF THE DRAWINGS

These and/or other aspects will become apparent and more readily appreciated from the following description of example embodiments, taken in conjunction with the accompanying drawings in which.

DETAILED DESCRIPTION OF EXAMPLE EMBODIMENTS

Reference will now be made in detail to embodiments, examples of which are illustrated in the accompanying drawings. Example embodiments may, however, be embodied in many different forms and should not be construed as being limited to those set forth herein. Rather, example embodiments are provided so that this disclosure will be thorough and complete. In at least some example embodiments, well-known device structures and well-known technologies will not be specifically described in order to avoid ambiguous interpretation.

It will be understood that when an element is referred to as being "connected to" or "coupled to" another element, it can be directly on, connected or coupled to the other element or intervening elements may be present. In contrast, when an element is referred to as being "directly connected to" or "directly coupled to" another element, there are no intervening elements present. Like numbers refer to like elements throughout. As used herein, the term "and/or" includes any and all combinations of one or more of the associated listed items.

It will be understood that, although the terms first, second, third, etc., may be used herein to describe various elements, components and/or sections, these elements, components and/or sections should not be limited by these terms. These terms are only used to distinguish one element, component or section from another element, component or section. Thus, a first element, component or section discussed below could be termed a second element, component or section without departing from the teachings of example embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including" when used in this specification, specify the presence of stated components, steps, operations, and/or elements, but do not preclude the presence or addition of one or more other components, steps, operations, elements, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Spatially relative terms, such as "below", "beneath", "lower", "above", "upper", and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

In the drawings, like reference numerals refer to like elements throughout, and also, the sizes of elements are exaggerated for clarity and explanation convenience.

Figure 1:
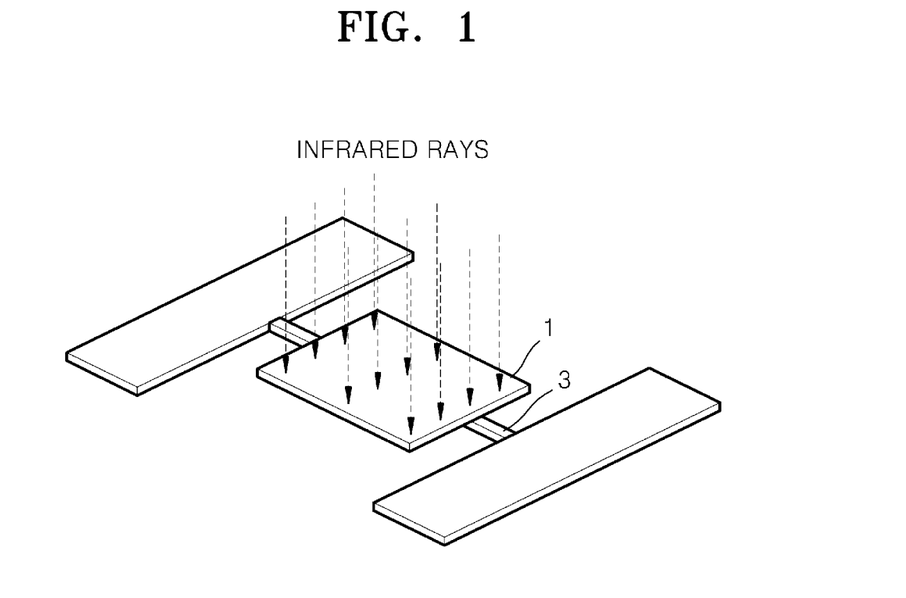
FIG. 1 is a schematic perspective view showing a concept of an infrared ray detector according to an example embodiment.

FIG. 1 is a schematic perspective view showing a concept of an infrared ray detector according to an example embodiment.

Referring to FIG. 1, when radiated infrared rays are incident to a thermal mass 1 (e.g., a thermal detector) that is connected to the surroundings by thermal legs 3, the temperature of the thermal mass 1 increases. The temperature change ΔT of the thermal mass 1 may be expressed as Equation 1 below at an equilibrium state.

$$\Delta T = \frac{\varepsilon \Phi_0 A_d}{\sqrt{G_{th}^2 + w^2 C_{th}^2}} \quad \text{[Equation 1]}$$

In Equation 1, $\varepsilon$ indicates an optical absorption rate, $\Phi_0$ is incident infrared ray radiation flux, $A_d$ is a detection area of the thermal mass 1, $G_{th}$ is thermal conductivity of the thermal legs 3, $\omega$ is a frequency of signal that is received by the infrared ray detector, and $C_{th}$ is thermal capacity of the thermal mass 1.

As shown by Equation 1, in order to increase the detection efficiency of infrared rays, it is necessary to reduce the thermal conductivity $G_{th}$ of the thermal legs 3 and the thermal capacity $C_{th}$ of the thermal mass 1, and to increase the incident infrared ray radiation flux $\Phi_0$ and the detection area $A_d$ of the thermal mass 1. However, if a pixel (e.g., the thermal mass or thermal pixel) size is reduced to realize a thermal camera having a high resolution and a high temperature precision, then the incident energy amount and the length of the thermal legs is reduced. As a result, the thermal conductivity (of the thermal legs 3) is increased, and accordingly, the amount of temperature change is reduced, which results in an increase of the temperature noise figure. Therefore, pixels (e.g., thermal pixels) having a size greater than a diffraction limit of a detected IR ray wavelength is needed. For example, if a wavelength of an IR ray is approximately 10 μm, then a pixel size of approximately 17 μm is required.

Many studies have been conducted about devices that use localized surface-plasmon resonance (LSPR) in nano-optics. A complete optical absorption phenomenon that uses the LSPR phenomenon may be achieved by maximally pressing transmission and reflection of incident light in a stack structure having a patterned metal layer/dielectric layer/patterned metal layer or a flat metal layer, controlling an electric coupling of the incident light through using certain types of material and certain shapes of the metal layers, and/or controlling a magnetic coupling of the incident light through the control of a kind and a thickness of a material used to form the dielectric layer.

In the case of an optical absorption using the LSPR phenomenon, an optical absorption of a wide region by a small structure is possible because an optical cross-sectional area is wide. Thus, when a coupling is generated between incident light and a metal structure through an LSPR phenomenon, the size of a thermal mass (e.g., a thermal detector) may be greatly reduced since the light is focused on a very small region. For example, the thermal mass may be reduced to below ⅕ of a previous value before taking advantage of LSPR phenomenon. Therefore, a narrow thermal leg may be formed, and thus, reduce its electrical conductivity to approximately below ⅕ of a pre-LSPR value.

When an optical absorption technique that uses the LSPR phenomenon is applied to an infrared ray thermal detector, the same amount of temperature change may be possible with a smaller pixel size. For example, the pixel size may be approximately half the size of the minimum pixel size achieved using conventional techniques. Further, in a LSPR pixel having the same size as the pixel of conventional techniques, the amount of temperature change may be, for example, approximately greater than 3 times than that of the pixels used without LSPR phenomenon.

Figure 2A:
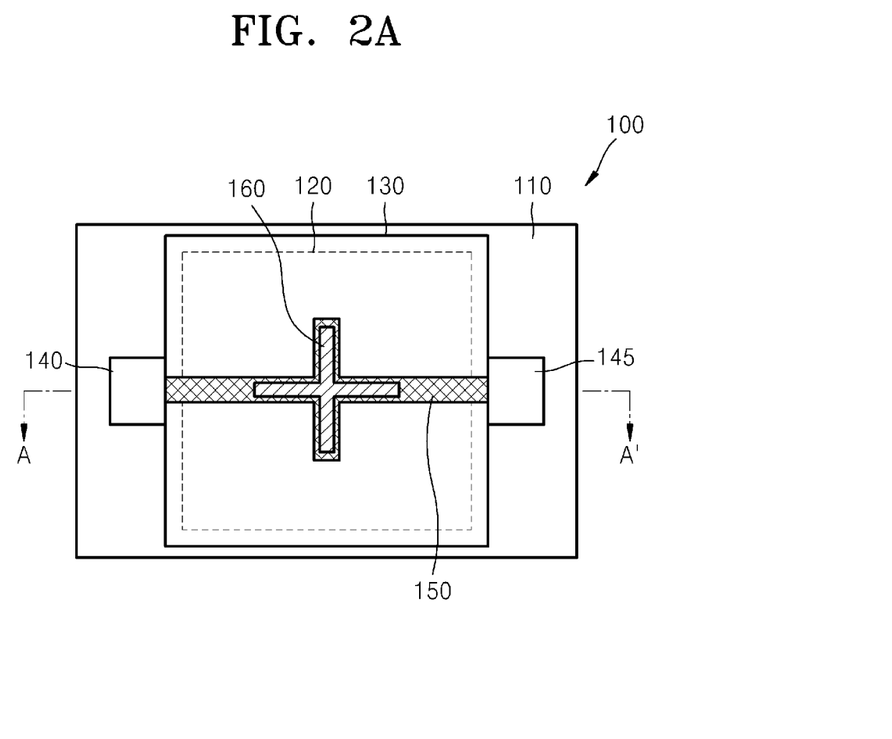
FIG. 2A is a schematic plan view of an infrared ray detector according to an example embodiment.
Figure 2B:
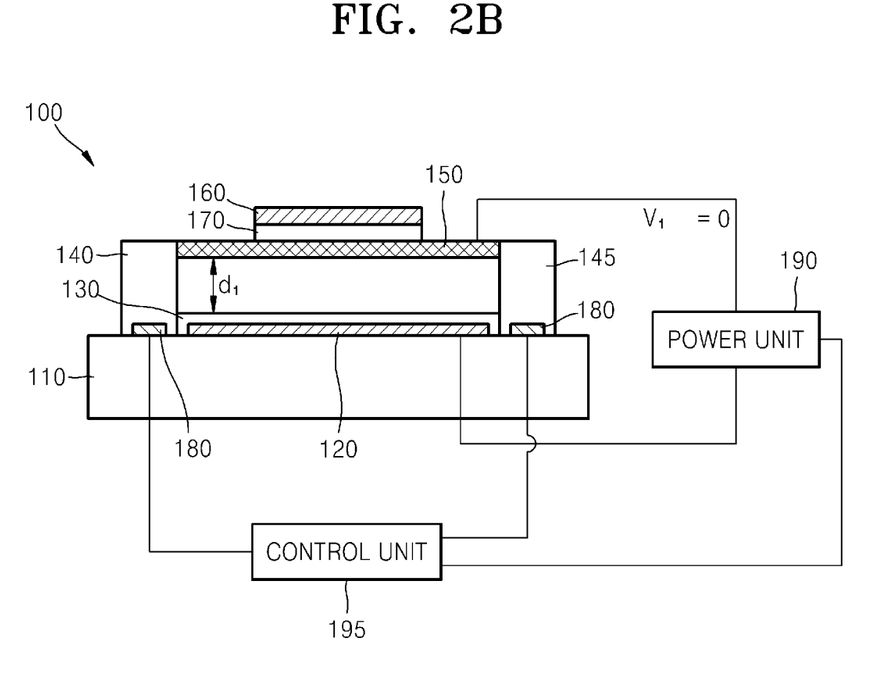
FIG. 2B is a schematic cross-sectional view of the infrared ray detector of FIG. 2A.

FIG. 2A is a schematic plan view of an infrared ray detector 100 according to an example embodiment, and FIG. 2B is a schematic cross-sectional view of the infrared ray detector 100 of FIG. 2A.

Referring to FIGS. 2A and 2B, the infrared ray detector 100 may include a substrate 110, a first metal layer 120 formed on the substrate 110, a second metal layer 160 that is separated from the first metal layer 120 and absorbs incident infrared rays IR, a thermistor layer 170 that supports the second metal layer 160, a thermal leg 150 that supports the second metal layer 160 and the thermistor layer 170, and a control unit 195 that controls a gap between the first metal layer 120 and the thermal leg 150.

The substrate 110 may include a read-out circuit (not shown). Also, metal wires 180 may be formed on the substrate 110 to electrically connect the thermal leg 150 to the read-out circuit. According to an example embodiment, the control unit 195 may include the read-out circuit.

The first metal layer 120 may be formed on the substrate 110, and may be connected to a power unit 190 in order to apply an electrostatic force between the first metal layer 120 and the thermal leg 150. The first metal layer 120 may include, for example, Au, Ag, Pt, Cu, Al, Ti, etc. and/or an alloy of these metals. The first metal layer 120 may reflect light incident thereto so that the light may not be transmitted to the substrate 110. The first metal layer 120 may be formed of the same material used to form the metal wires 180 at the same time when the metal wires 180 are formed.

An insulating layer 130 may further be formed between the first metal layer 120 and the thermal leg 150. For example, the insulating layer 130 may be formed on the first metal layer 120. The insulating layer 130 may insulate the first metal layer 120 from the thermal leg 150 when an electrostatic force is applied between the first metal layer 120 and the thermal leg 150. Also, the insulating layer 130 may be formed of, for example, silicon oxide or silicon nitride.

The thermal leg 150 is separated from the substrate 110 and may support the second metal layer 160. The thermal leg 150 may be formed of at least one of silicon nitride, silicon oxide, a metal material, and a thermistor material, and may be formed in a single layer structure or a multi-layer structure. The thermal leg 150 may be electrically connected to a detection circuit (not shown) and the power unit 190. Also, the first metal layer 120 and the thermal leg 150 may be connected to the power unit 190 to apply an electrostatic force between the first metal layer 120 and the thermal leg 150.

The second metal layer 160 may be formed on the thermistor layer 170 to absorb incident infrared rays IR. The second metal layer 160 may absorb infrared rays IR having a wavelength in a range from about 8 µm to about 14 µm, and more specifically, for example, 10 µm. The second metal layer 160 may include, for example, Au, Ag, Pt, Cu, Al, Ti, etc. and/or an alloy of these metals. Also, the second metal layer 160 may have a patterned shape to absorb infrared rays IR by generating an LSPR. The LSPR may be generated by a complex refraction between the second metal layer 160 and the thermistor layer 170. The second metal layer 160 may be formed in a disc shape, a ring shape, a bar shape, a shape in which a plurality of bars cross each other, or a combination of these shapes. For example, the second metal layer 160 may be formed in a shape in which a first bar and a second bar are perpendicular and cross each other.

The thermistor layer 170 may be formed on the thermal leg 150 to support the second metal layer 160. The resistance of the thermistor layer 170 may vary according to the temperature change that occurs due to the infrared rays IR absorbed at the second metal layer 160. The thermistor layer 170 may be formed of a thermistor material, the resistance of which is changed according to a temperature change. For example, the thermistor layer 170 may be formed of include amorphous silicon, vanadium oxide, nickel oxide, Si—Ge, etc. and/or a semiconductor material.

The thermistor layer 170 may have a patterned shape so that incident light generates an LSPR. For example, the thermistor layer 170 may be formed in a disc shape, a ring shape, a bar shape, a shape in which a plurality of bars cross each other, or a combination of these shapes. The second metal layer 160 and the thermistor layer 170 may be patterned in the same shape or different shapes. Also, the thermal leg 150 may have a meander shape or a bar shape. Thus, the second metal layer 160 and the thermistor layer 170 may be connected to the thermal leg 150 through first and second post units 140 and 145. The thermal leg 150 may have a flat plate having no specific pattern.

A dielectric layer (not shown) may further be formed between the second metal layer 160 and the thermistor layer 170. The dielectric layer may transfer heat generated from the second metal layer 160 to the thermistor layer 170. Also, the dielectric layer may be formed of, for example, silicon oxide or silicon nitride.

The LSPR may occur at an interface between the second metal layer 160 and the thermistor layer 170 or between the second metal layer 160 and the dielectric layer by incident infrared rays IR. Accordingly, the temperature of the thermistor layer 170 may be increased due to the heat generated by the LSPR. Since the thermistor layer 170 is formed of a material that converts a temperature change to a resistance change, the resistance may be changed by the transmitted heat. Also, the change of the resistance may be transmitted to the control unit 195 through the thermal leg 150, the first and second post units 140 and 145, and the substrate 110. That is, the temperature change in the second metal layer 160 by the absorbed infrared rays IR is converted to a resistance change in the thermistor layer 170, and the resistance change may be transmitted to the control unit 195. Accordingly, the control unit 195 may detect a thermal image by reading the resistance change.

Also, a plurality of post units that are separated from each other may be formed on the substrate 110. The plurality of post units may include the first and second post units 140 and 145. The first and second post units 140 and 145 may be connected to the thermal leg 150 and may support the thermal leg 150 so that the thermal leg 150 may be separated by a desired (or alternatively, predetermined) distance from the substrate 110. Also, the first and second post units 140 and 145 may transfer a resistance change of the thermistor layer 170 transmitted through the thermal leg 150 to the metal wires 180 that are under the first and second post units 140 and 145. That is, the resistance change may be transmitted to the control unit 195 from the thermistor layer 170 through the thermal leg 150 and the first and second post units 140 and 145. The first and second post units 140 and 145 may be formed of a conductor or may be formed of the same material used to form the thermal leg 150.

The power unit 190 may apply an electrostatic force between the first metal layer 120 and the thermal leg 150. For example, the power unit 190 may apply a voltage between the first metal layer 120 and the thermal leg 150, and a gap d1 between the first metal layer 120 and the thermal leg 150, that is, an air gap between the first metal layer 120 and the thermal leg 150 may vary according to the magnitude of the applied voltage.

The control unit 195 may control the gap d1 between the first metal layer 120 and the thermal leg 150. For example, the control unit 195 may control the gap d1 by changing the magnitude of the voltage applied between the first metal layer 120 and the thermal leg 150. The control unit 195 includes a read-out circuit to read a thermal image in response to a resistance change received from the thermistor layer 170. Also, the control unit 195 may read a thermal image in response to a resistance change received from the thermistor layer 170 while controlling the gap d1 between the first metal layer 120 and the thermal leg 150.

When the gap d1 between the first metal layer 120 and the thermal leg 150 is changed, the infrared ray absorption rate or infrared ray reflection rate of the second metal layer 160 may vary. For example, when the gap d1 between the first metal layer 120 and the thermal leg 150 is an initial desired (or alternatively, predetermined) value, the infrared ray detector 100 may absorb most of incident infrared rays IR. However, as shown in FIG. 3B, when the gap d1 between the first metal layer 120 and the thermal leg 150 is zero, that is, there is no air gap between the first metal layer 120 and the thermal leg 150, the infrared ray detector 100 may reflect most of incident infrared rays IR.

The control unit 195 may compensate for a second resistance change of the thermistor layer 170 at the time when the gap d1 between the first metal layer 120 and the thermal leg 150 is an initial desired (or alternatively, predetermined) value based on a first resistance change of the thermistor layer 170 at the time when a gap d3 between the first metal layer 120 and the thermal leg 150 is zero. In the case when the infrared ray detector 100 reflects most of incident infrared rays IR, the resistance of the thermistor layer 170 may vary due to an external factor not associated with infrared rays IR. In other words, a detector according to example embodiments may compensate for an error caused by external factors and output a more accurate thermal image. Accordingly, when a temperature change according to an external factor and the first resistance change that resulted from the temperature change is deducted from the second resistance of the thermistor layer 170 at the time when the gap d1 between the first metal layer 120 and the thermal leg 150 is a desired (or alternatively) predetermined value, the infrared ray detector 100 may obtain a compensated temperature change and a resistance change caused by the actual incident infrared rays IR. Accordingly, the infrared ray detector 100 may obtain a more accurate thermal image by compensating for the temperature change caused by an external factor.

The infrared ray detector 100 may include a mechanical shutter or a thermoelectric cooler (TEC), and thus, may be more compact than the case of compensating for a temperature change and a resistance change. Also, the infrared ray detector 100 may be a single pixel, and thus, the compensation may be performed in each of the pixels. Accordingly, by including 1×n (n is a natural number) number of dummy detector arrays in a region where the infrared rays IR are not incident, the infrared ray detector 100 may obtain a more correct thermal image than the case when the temperature change is compensated for by comparing m×n (m and n are natural numbers) of detector arrays included in a region where the infrared rays IR are incident.

Figure 3A:
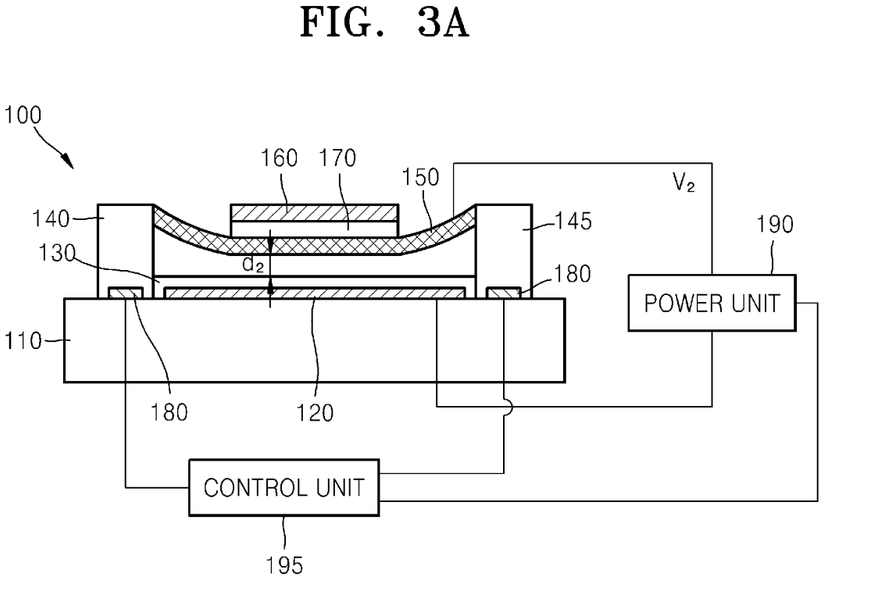
FIGS. 3A and 3B are schematic cross-sectional views showing experiments of the infrared ray detector of FIG. 2B.
Figure 3B:
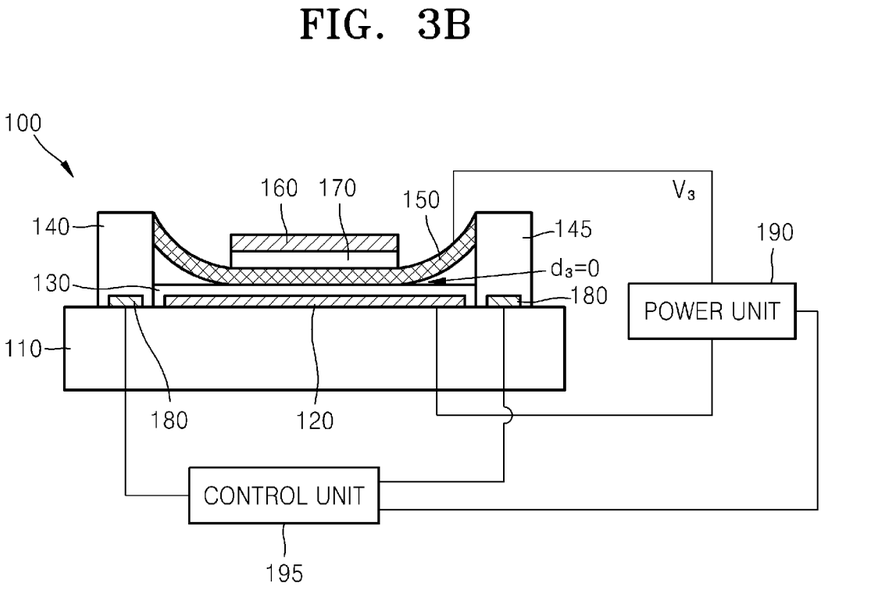

FIGS. 3A and 3B are schematic cross-sectional views showing the infrared ray detector 100 of FIG. 2B at various stages of operation.

A desire (or alternatively, predetermined) voltage V1 may be applied between the first metal layer 120 and the thermal leg 150 of the infrared ray detector 100 depicted in FIG. 2B from the power unit 190, and the desired (or alternatively, predetermined) voltage V1 may be 0 V. That is, a voltage may not be applied between the first metal layer 120 and the thermal leg 150 of the infrared ray detector 100. In this case, the gap d1 between the first metal layer 120 and the thermal leg 150, that is, the thickness of an air layer between the first metal layer 120 and the thermal leg 150 may have an initial desired (or alternatively, predetermined) value, and the infrared ray detector 100 may absorb most of incident infrared rays IR.

Referring to FIG. 3A, a second desired (or alternatively, predetermined) voltage V2 may be applied between the first metal layer 120 and the thermal leg 150 of the infrared ray detector 100 from the power unit 190. In this case, a gap d2 between the first metal layer 120 and the thermal leg 150, that is, an air layer between the first metal layer 120 and the thermal leg 150, may have a thickness smaller than that of the gap d1 of FIG. 2B, and the infrared ray detector 100 may absorb a portion of incident infrared rays IR and may reflect the remaining portion of the incident infrared rays IR.

Referring to FIG. 3B, a third desired (or alternatively, predetermined) voltage V3 may be applied between the first metal layer 120 and the thermal leg 150 of the infrared ray detector 100 from the power unit 190. The desired (or alternatively, predetermined) voltage V3 may be greater than the second desired (or alternatively, predetermined) voltage V2 applied to the infrared ray detector 100 of FIG. 3A. In this case, a gap d3 between the first metal layer 120 and the thermal leg 150 may be zero. That is, the thermal leg 150 may contact the first metal layer 120. Accordingly, the infrared ray detector 100 may reflect most of incident infrared rays IR. In this case, since the infrared ray detector 100 does not absorb incident infrared rays IR, the first resistance change due to the temperature change in the thermal leg 150 occurs due to an external factor and not due to the incident infrared rays IR. Accordingly, the control unit 195 may determine a compensated resistance change based on the second resistance change (i.e., when the gap d1 between the first metal layer 120 and the thermal leg 150 is the initial desired value) and on the first resistance change (i.e., when the gap d3 between the first metal layer 120 and the thermal leg 150 is zero). That is, the control unit 195 may obtain a compensated resistance change by subtracting the first resistance change from the second resistance change. Therefore, the infrared ray detector 100 may obtain an accurate thermal image using the compensated resistance change.

Figure 4:
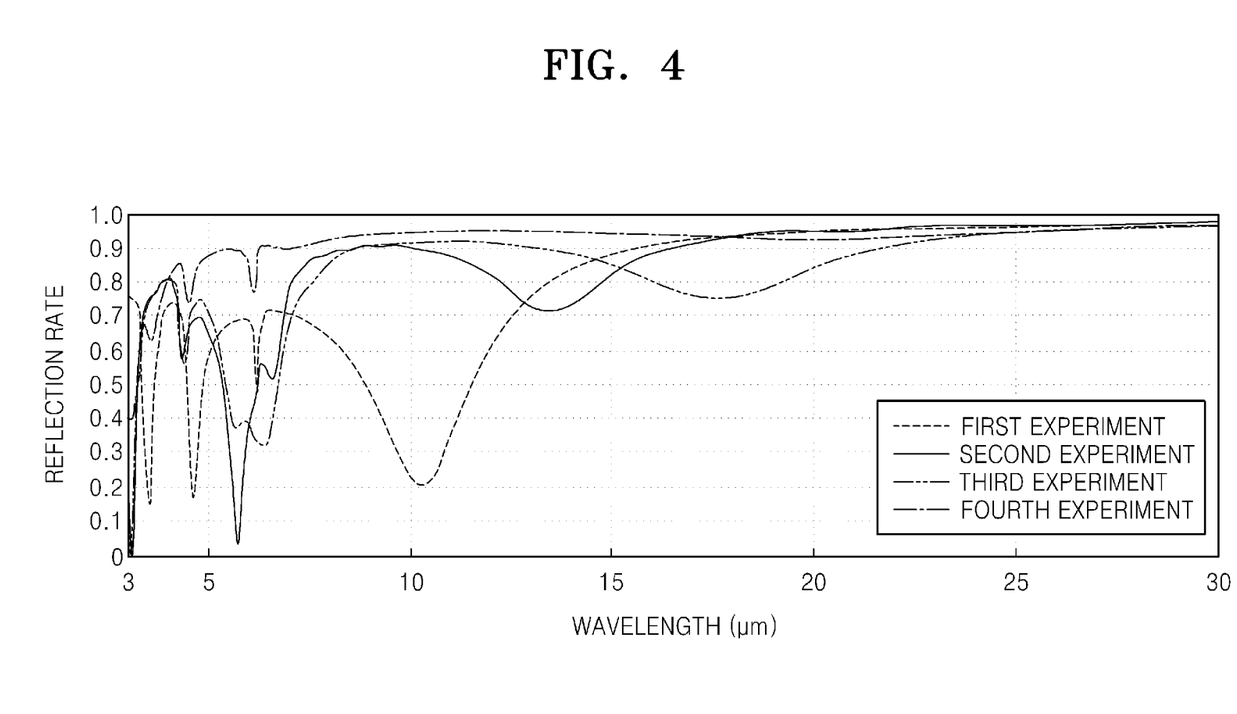
FIG. 4 is a graph showing experiment results of reflection rates with respect to infrared rays of an infrared ray detector according to an example embodiment.

FIG. 4 is a graph showing results of experiments of reflection rates versus infrared rays IR of the infrared ray detector 100 according to an example embodiment.

Referring to FIG. 4, the first through fourth experiments show different reflection rates versus infrared rays IR of the infrared ray detector 100. In the first through fourth experiments, the infrared ray detector 100 depicted in FIG. 2B was used, and the magnitudes of voltages applied between the first metal layer 120 and the thermal leg 150 are different from each other. That is, in the infrared ray detector 100 used for the first through fourth experiments, gaps between the first metal layer 120 and the thermal leg 150 are different from each other. For example, in the infrared ray detector 100 for the first experiment, the gap d1 between the first metal layer 120 and the thermal leg 150 may be the initial desired (or alternatively, predetermined) value that may generate an LSPR at an incident infrared ray IR having a wavelength of approximately 10 µm. In the infrared ray detector 100 used for the fourth experiment, the gap d3 between the first metal layer 120 and the thermal leg 150 may be zero, and in this case, the LSPR may not occur in an incident wavelength region in a range from about 8 µm to about 14 µm.

In the infrared ray detectors 100 used to form the second and third experiment, the gaps d2 and d3 between the first metal layer 120 and the thermal leg 150 may be 60% and 80% of the initial desired (or alternatively, predetermined) value, respectively. In the case of the second through fourth experiments, it is seen that the reflection rates of an infrared ray IR having a wavelength of approximately 10 µm are very high when compared to that of the first experiment. In particular, in the case of the fourth experiment, the reflection rate of an infrared ray IR having a wavelength of approximately 10 µm is the highest. In other words, the resistance change in the thermistor layer 170 occurs due to an external factor and not due to the incident infrared ray IR.

According to at least one example embodiment, the thermal leg 150 is formed of a material used to form the thermistor layer 170. Therefore, the thermal leg 150 may perform the function of the thermistor layer 170. In this case, an additional thermistor layer is not necessary.

Figure 5A:
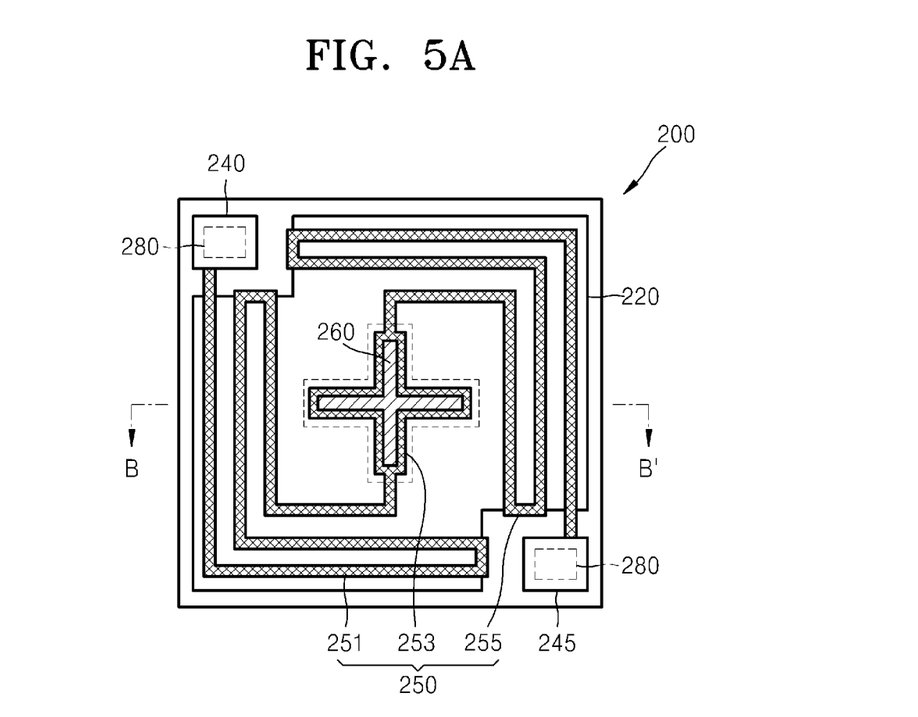
FIG. 5A is a schematic plan view of an infrared ray detector according to another example embodiment.
Figure 5B:
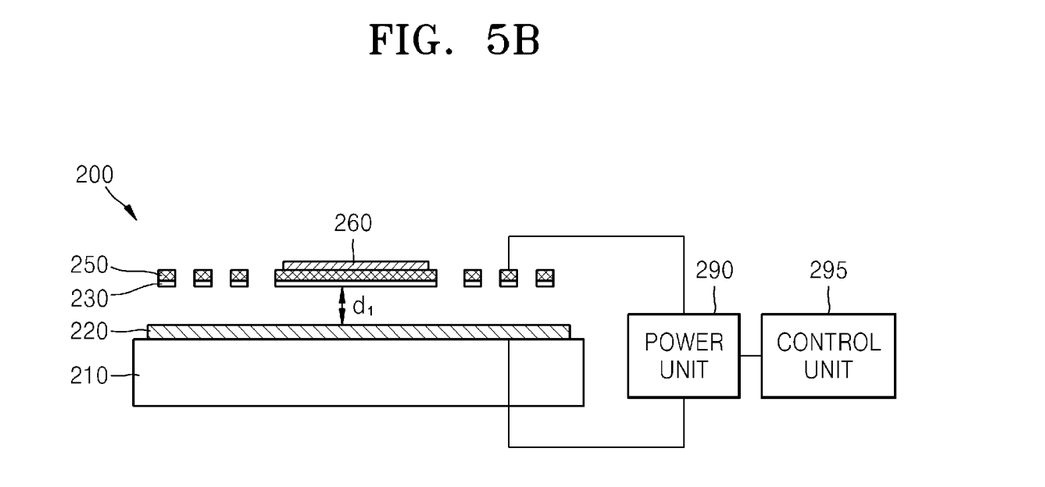
FIG. 5B is a schematic cross-sectional view taken along the line BB' of the infrared ray detector of FIG. 5A.

FIG. 5A is a schematic plan view of an infrared ray detector 200 according to another example embodiment, and FIG. 5B is a schematic cross-sectional view taken along the line BB' of the infrared ray detector 200 of FIG. 5A.

Referring to FIGS. 5A and 5B, the infrared ray detector 200 may include a substrate 210, a first metal layer 220 formed on the substrate 210, a second metal layer 260 that is separated from the first metal layer 220 and absorbs incident infrared rays IR, a thermal leg 250 that supports the second metal layer 260, and a control unit 295 that controls a gap between the first metal layer 220 and the thermal leg 250.

The thermal leg 250 is separated from the substrate 210 and may support the second metal layer 260. The thermal leg 250 may be formed of a thermistor material, and thus, may have a different resistance according to temperature change. The thermal leg 250 may be connected to a power unit 290 to apply an electrostatic force between the first metal layer 220 and the thermal leg 250.

Also, the thermal leg 250 may be formed in a meander shape to prevent heat from transferring into the substrate 210. For example, the thermal leg 250 may include first, second, and third sections 251, 253, and 255. The first section 251 may connect a first post unit 240 to the second section 253 and may be formed in a meander shape. The second section 253 of the thermal leg 250 is formed between first and second post units 240 and 245 and may be formed in a shape in which two bars perpendicularly cross. Also, the third section 255 of the thermal leg 250 may connect the second section 253 to the second post unit 245 and may be formed in a meander shape. Alternatively, the thermal leg 250 may be formed as a flat plate having no specific patterns.

An insulating layer 230 may further be formed between the first metal layer 220 and the thermal leg 250. For example, the insulating layer 230 may be formed on a lower surface of the thermal leg 250. When an electrostatic force is applied between the first metal layer 220 and the thermal leg 250, the insulating layer 230 may insulate the first metal layer 220 from the thermal leg 250. Also, the insulating layer 230 may be formed of, for example, silicon oxide or silicon nitride.

The second metal layer 260 may be formed on the thermal leg 250 to absorb incident infrared rays IR. The second metal layer 260 may absorb infrared rays IR having a wavelength in a range from about 8 µm to about 14 µm, for example, an infrared ray IR having a wavelength of approximately 10 µm. Also, the second metal layer 260 may have a patterned shape to absorb infrared rays IR by generating an LSPR. The second metal layer 260 may be formed in a disc shape, a ring shape, a bar shape, a shape in which a plurality of bars cross each other, or a combination of these shapes. The second metal layer 260 may be formed on the second section 253 of the thermal leg 250 and may be patterned in the same shape as the second section 253. For example, the second metal layer 260 may be formed in a shape in which a first bar shape and a second bar shape perpendicularly cross each other.

The LSPR may occur by incident infrared rays IR at an interface between the second metal layer 260 and the thermal leg 250. Therefore, heat may be generated due to the LSPR, and as a result, temperature of the thermal leg 250 may increase. The heat is transferred to the thermal leg 250 from the second metal layer 260. Since the thermal leg 250 is formed of a thermistor material that converts a temperature change to a resistance change, the resistance of the thermal leg 250 may be changed by the heat. Also, the resistance change may be transmitted to the control unit 295 through the first and second post units 240 and 245 and a metal wire 280. That is, the temperature change caused by the infrared rays IR that are absorbed by the second metal layer 260 is converted to a resistance change in the thermal leg 250, and the resistance change may be transmitted to the control unit 295. Accordingly, the control unit 295 may realize a thermal image from the resistance change.

The control unit 295 may realize a thermal image in response to a resistance change received from the thermal leg 250 while controlling the gap d1 between the first metal layer 220 and the thermal leg 250. That is, the control unit 295, while controlling the gap d1 between the first metal layer 220 and the thermal leg 250, may compensate for a second resistance change of the thermal leg 250 when the gap d1 between the first metal layer 220 and the thermal leg 250 has an initial desired (or alternatively, predetermined) value, at which most of incident infrared rays IR are absorbed, based on a first resistance change of the thermal leg 250 when the gap d1 between the first metal layer 220 and the thermal leg 250 is zero. Accordingly, the infrared ray detector 200 may obtain an accurate thermal image by obtaining a compensated temperature change and a resistance change by the actual incident infrared rays IR without the effect of the first resistance change that resulted from the temperature change that is caused by an external factor.

Figure 6A:
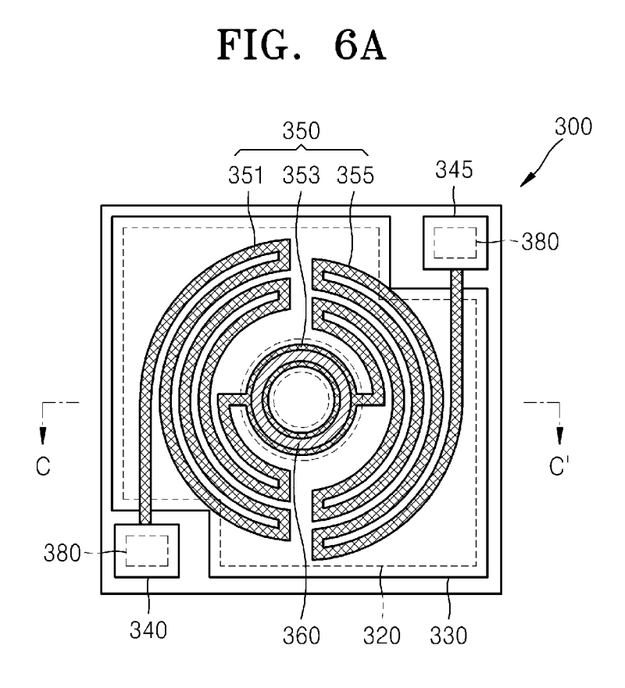
FIG. 6A is a schematic plan view of an infrared ray detector according to another example embodiment.
Figure 6B:
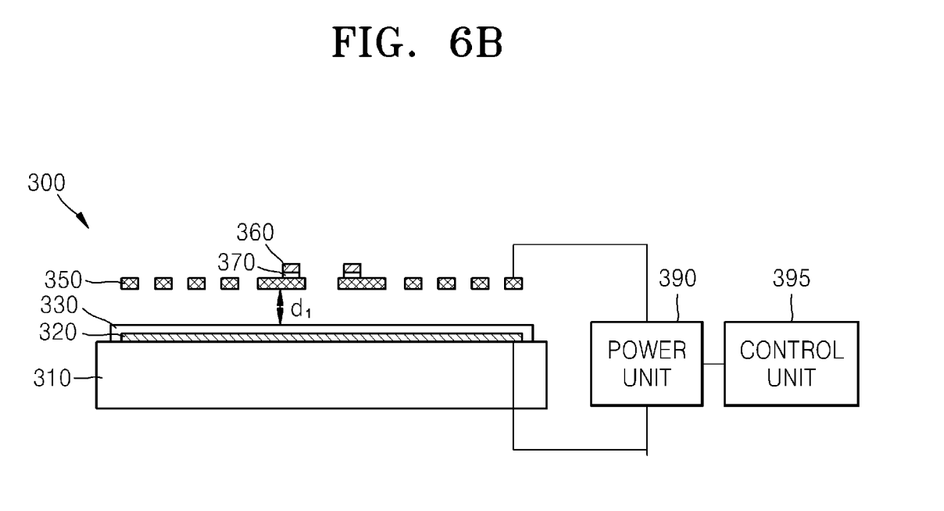
FIG. 6B is a schematic cross-sectional view of the infrared ray detector of FIG. 6A.

FIG. 6A is a schematic plan view of an infrared ray detector 300 according to an example embodiment, and FIG. 6B is a schematic cross-sectional view taken along the line CC' of the infrared ray detector 300 of FIG. 6A.

Referring to FIGS. 6A and 6B, the infrared ray detector 300 may include a substrate 310, a first metal layer 320 formed on the substrate 310, a second metal layer 360 that is separated from the first metal layer 320 and absorbs incident infrared rays IR, a thermistor layer 370 that supports the second metal layer 360, a thermal leg 350 that supports the thermistor layer 370, and a control unit 395 that controls a gap d1 between the first metal layer 320 and the thermal leg 350.

The thermal leg 350 may be separated from the substrate 310 and may support the second metal layer 360 and the thermistor layer 370. Also, the thermal leg 350 may be connected to a power unit 390 to apply an electrostatic force between the first metal layer 320 and the thermal leg 350. Also, the thermal leg 350 may be formed in a meander shape to reduce (or alternatively, prevent) transferring heat generated from the thermal leg 350 from transferring to the substrate 310. For example, the thermal leg 350 may include first, second, and third sections 351, 353, and 355. The first section 351 may connect a first post unit 340 to the second section 353 and may be formed in a meander shape. The second section 353 may be formed between the first post unit 340 and a second post unit 345 and may be formed in a ring shape. Also, the third section 355 may connect the second section 353 to the second post unit 345 and may be formed in a meander shape. Also, the thermal leg 350 may be formed in a flat shape having no specific patterns.

An insulating layer 330 may further be formed between the first metal layer 320 and the thermal leg 350. For example, the insulating layer 330 may be formed on an upper surface of the first metal layer 320. When an electrostatic force is applied between the first metal layer 320 and the thermal leg 350, the insulating layer 330 may insulate the first metal layer 320 from the thermal leg 350. Also, the insulating layer 330 may be formed of, for example, silicon oxide or silicon nitride.

The second metal layer 360 may be formed on the thermal leg 350 to absorb incident infrared rays IR. The second metal layer 360 may absorb infrared rays IR having a wavelength in a range from about 8 µm to about 14 µm, for example, a wavelength of 10 µm. Also, the second metal layer 360 may have a patterned form to absorb infrared rays IR by generating an LSPR. The second metal layer 360 and the thermistor layer 370 may have a disc shape, a ring shape, a bar shape, a shape in which a plurality of bars cross each other, or a combination of these shapes. The second metal layer 360 and the thermistor layer 370 may be formed on the second section 353 of the thermal leg 350 and may be patterned in the same shape as the second section 353. For example, the second metal layer 360 may be formed in a ring shape on the second section 353 of the thermal leg 350.

The LSPR may occur on an interface between the second metal layer 360 and the thermistor layer 370 by incident infrared rays IR. When a dielectric layer is further included between the second metal layer 360 and the thermistor layer 370, the LSPR may occur at an interface between the second metal layer 360 and the dielectric layer. Heat generated due to the incident infrared rays IR may be transferred from the second metal layer 360 to the thermistor layer 370, and the resistance of the thermistor layer 370 may be changed. The resistance change of the thermistor layer 370 may be transferred to the control unit 395 through the power unit 390, the first and second post units 340 and 345, and a metal wire 380. Also, the control unit 395 may realize a thermal image in response to the resistance change of the thermistor layer 370 while controlling the gap d1 between the first metal layer 320 and the thermal leg 350. Accordingly, the infrared ray detector 300 may realize an accurate thermal image by obtaining a compensated temperature change and resistance change caused by actual incident infrared rays IR without the effect of a first resistance change that resulted from a temperature change that is caused by an external factor.

A method of detecting infrared rays IR by using the infrared ray detector 100 will now be described.

Referring to FIGS. 2A, 2B, and 3B, the infrared rays IR incident to the second metal layer 160 may be absorbed by the LSPR. The LSPR may occur at an interface between the second metal layer 160 and the thermistor layer 170 or between the second metal layer 160 and the dielectric layer (not shown).

The detector 100 may absorb or reflect the incident infrared rays IR while the control unit 195 changes the gap d1 between the first metal layer 120 and the thermal leg 150. For example, when the gap d1 between the first metal layer 120 and the thermal leg 150 is an initial desired (or alternatively, predetermined value), the infrared ray detector 100 may absorb most of the incident infrared rays IR. However, as shown in FIG. 3B, if the gap d1 between the first metal layer 120 and the thermal leg 150 is zero, that is, an air gap is not present between the first metal layer 120 and the thermal leg 150, then the infrared ray detector 100 may reflect most of the incident infrared rays IR.

Heat is generated from the second metal layer 160 due to the absorbed infrared rays IR, and the heat may be transferred to the thermistor layer 170 from the second metal layer 160. Because the thermistor layer 170 converts the temperature change to a resistance change, the resistance of the thermistor layer 170 may be change due to the transmitted heat. Also, the resistance change may be transmitted to the control unit 195 through the thermal leg 150, the first and second post units 140 and 145, and the substrate 110. That is, the temperature change due to the infrared rays IR absorbed in the second metal layer 160 is converted to a resistance change in the thermistor layer 170, and the resistance change is transmitted to the control unit 195. Accordingly, the control unit 195 may realize a thermal image in response to the resistance change.

Also, the control unit 195 may compensate for a second resistance change of the thermistor layer 170 when the gap d1 between the first metal layer 120 and the thermal leg 150 is an initial desired (or alternatively, predetermined) value based on the first resistance change of the thermistor layer 170 in the case when the gap d3 between the first metal layer 120 and the thermal leg 150 is zero. In the method of detecting incident infrared rays IR, if most of infrared rays IR incident to the infrared ray detector 100 are reflected, then the resistance of the thermistor layer 170 may be changed by an external factor besides the incident infrared rays IR. Accordingly, the method may obtain a compensated temperature change and resistance change due to the infrared rays IR actually incident to the infrared ray detector 100. The method may estimate a compensated temperature and resistance change by subtracting the first resistance change that resulted from the temperature change that is caused by an external factor is from the second resistance change that is obtained when the gap d1 between the first metal layer 120 and the thermal leg 150 is the initial desired (or alternatively, predetermined) value. Accordingly, the method described above realizes an accurate thermal image by compensating for a temperature change caused by an external factor. Also, the method of detecting incident infrared rays IR may be applied to the infrared ray detectors 200 and 300 shown in FIGS. 5A and 6A.

In an infrared ray detector and a method of detecting incident infrared rays IR, a temperature change and resistance change that occurs by incident infrared rays IR may be detected by compensating for a temperature change and resistance change caused by an external factor. Also, when the infrared ray detector and the method of detecting incident infrared rays IR are used, an accurate thermal image may be obtained since compensation is performed on a pixel-by-pixel basis.

It should be understood that the infrared ray detector and the method of detecting incident infrared rays IR described herein should be considered in a descriptive sense only and not for purposes of limitation. Descriptions of features or aspects within each example embodiment should typically be considered as available for other similar features or aspects in other example embodiments.

What is claimed is:

1. An infrared ray detector comprising:
   a first metal layer;
   a second metal layer on the first metal layer and configured to absorb infrared rays;
   a thermistor layer below the second metal layer, the thermistor layer having a resistance that changes according to infrared rays absorbed in the second metal layer;
   a bendable thermal leg below the thermistor layer and separated from the first metal layer; and
   a control unit configured to control a size of a gap between the first metal layer and the thermal leg by bending the thermal leg.

2. The infrared ray detector of claim 1, wherein the second metal layer has a patterned shape to absorb infrared rays by generating a localized surface plasmon resonance (LSPR).

3. The infrared ray detector of claim 2, wherein at least one of the second metal layer and the thermistor layer has at least one of a disc shape, a ring shape, a bar shape, and a shape in which a plurality of bars cross each other.

4. The infrared ray detector of claim 1, wherein the thermal leg includes at least one of silicon nitride, silicon oxide, a metal material, and a thermistor material.

5. The infrared ray detector of claim 4, wherein the thermal leg includes the thermistor material.

6. The infrared ray detector of claim 1, further comprising:
   a dielectric layer formed between the thermal leg and the second metal layer.

7. The infrared ray detector of claim 1, further comprising:
   an insulating layer between the first metal layer and the thermal leg.

8. The infrared ray detector of claim 1, further comprising:
   a plurality of post units separated from each other and connected to the thermal leg.

9. The infrared ray detector of claim 1, further comprising:
   a power unit configured to apply a voltage between the first metal layer and the thermal leg, wherein the control unit is configured to control the voltage of the power unit to bend the thermal leg and vary the size of the gap.

10. The infrared ray detector of claim 1, wherein the control unit is configured to obtain a compensated resistance by compensating for a second resistance change of the thermistor layer when the gap between the first metal layer and the thermal leg is a desired value based on a first resistance change of the thermistor layer when the gap between the first metal layer and the thermal leg is zero.

11. The infrared ray detector of claim 1, wherein the thermistor layer includes at least one of amorphous silicon, vanadium oxide, nickel oxide, and Si—Ge.

12. The infrared ray detector of claim 1, wherein the first and second metal layers are formed of at least one of Au, Ag, Pt, Cu, Al, Ti, and an alloy of these metals.

13. A thermal detector comprising:
    a first layer on a substrate;

a bendable thermistor layer above the first layer;
a second layer on the thermistor layer, the second layer being configured to vary a resistance of the thermistor layer according a change in temperature of the second layer, and the thermistor layer defining an air gap above the first layer; and
a control unit configured to,
vary a size of the air gap by bending the thermistor layer,
determine a compensated resistance change of the thermistor layer based on a first resistance change of the thermistor layer when the gap between the first metal layer and the thermal leg is a desired value and on a second resistance change of the thermistor layer when the gap between the first metal layer and the thermal leg is zero, and
output a thermal image according to the compensated resistance change.

14. The thermal detector of claim 13, wherein the compensated resistance change is a difference between the first resistance change and the second resistance change.

15. The thermal detector of claim 13, further comprising:
at least one post connected to the thermistor layer, the at least one post being on a side of the first layer and further defining the air gap; and
an insulating layer between the first layer and the thermistor layer.

16. The thermal detector of claim 13, further comprising:
a voltage supply coupled to the first layer and the thermistor layer, wherein the control unit is configured to vary the size of the air gap according to a voltage from the voltage supply.

17. A thermal detector, comprising:
a first layer on a substrate;
a thermistor layer above the first layer;
a second layer on the thermistor layer, the second layer being configured to vary a resistance of the thermistor layer according a change in temperature of the second layer, and the thermistor layer defining an air gap above the first layer; and
a control unit configured to vary a size of the air gap, determine a compensated resistance change, and output a thermal image according to the compensated resistance change, wherein a localized surface plasmon resonance occurs at an interface of the thermistor layer and the second layer.

18. The thermal detector of claim 17, wherein the thermistor layer is a multi-layer structure including a thermistor device on a thermal leg, and the thermal leg is coupled to a detection circuit of the thermal detector.

* * * * *